United States Patent [19]

Bond et al.

[11] Patent Number: 4,560,832
[45] Date of Patent: Dec. 24, 1985

[54] TELEPHONE SYSTEM

[75] Inventors: Raymond G. Bond, Long Beach; Masroor A. Batla, Saugus, both of Calif.

[73] Assignee: T.A.D. Avanti, Inc., Compton, Calif.

[21] Appl. No.: 583,991

[22] Filed: Feb. 27, 1984

[51] Int. Cl.[4] .......................... H04Q 7/04; H04K 1/00
[52] U.S. Cl. ............................... 179/2 EA; 179/1.5 E
[58] Field of Search .............................. 179/2 E-2 EC, 179/1.5 R, 1.5 E, 1.5 M, 1.5 S; 375/2.1, 2.2

[56] References Cited

U.S. PATENT DOCUMENTS

| 4,171,513 | 10/1979 | Otey et al. | 179/1.5 E |
| 4,291,197 | 9/1981 | Yonaga | 179/2 EA |
| 4,467,141 | 8/1984 | Resch et al. | 179/2 EA |

*Primary Examiner*—Gene Z. Rubinson
*Assistant Examiner*—W. J. Brady
*Attorney, Agent, or Firm*—Keith D. Beecher

[57] ABSTRACT

A cordless telephone system in which the incoming ring signals and audio signals transmitted from the base station to the remote station are digitized and encoded in accordance with a pseudo random code, and the outgoing dial pulses and speech signals transmitted from the remote station to the base station are also digitized and encoded by a pseudo random code, so as to avoid unwanted operation of neighboring cordless telephone system and also to preclude eavesdropping of phone conversations. Multiple channels may be used between the base station and the remote station to avoid nulls in the communication.

5 Claims, 2 Drawing Figures

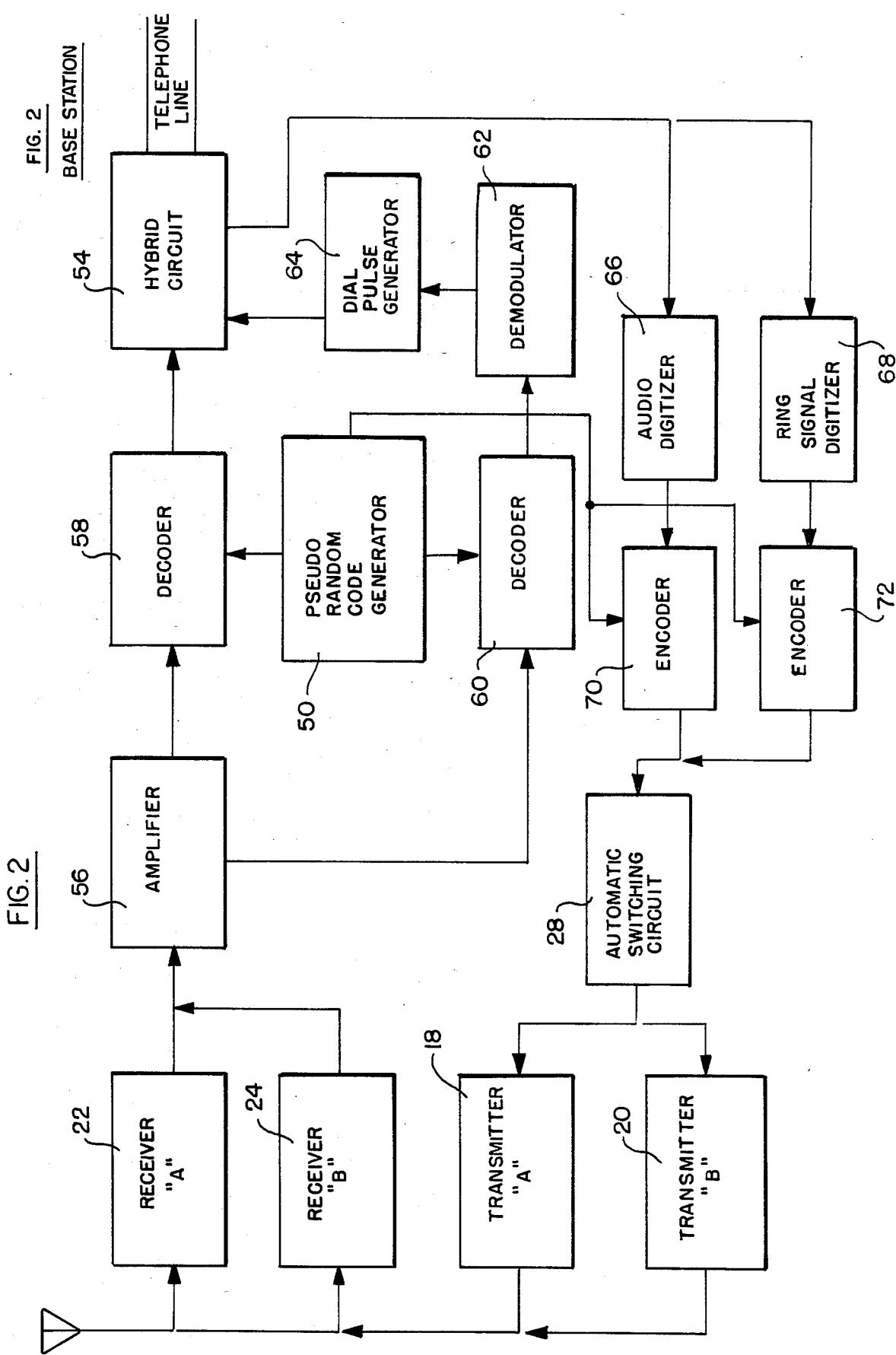

TELEPHONE SYSTEM

BACKGROUND OF THE INVENTION

Various types of cordless telephone systems are described, for example, in U.S. Pat. No. 4,291,197. In such systems, the remote station is coupled to the base station by a wireless link. The base station is connected to the telephone line, and it responds to ring signals and incoming calls from remote callers to ring the remote station and to enable a twoway conversation to be carried out between the person at the remote station and each caller.

In the usual present-day type of cordless telephone system, the audio and other signals are frequency modulated, on the carrier, and they have a relatively narrow bandwidth. The usual range of present-day cordless telephone systems is about 500 feet.

The narrow band transmission characteristic of the present-day cordless telephone system has problems in that the transmitted signals have peaks and nulls as the telephone at the remote station is moved from place-to-place. This condition is alleviated in the embodiment of the present invention to be described by providing multiple communication channels between the base station and the remote station, and if communication fails in any channel to select automatically another channel.

Other problems encountered in present-day cordless telephone systems include inadvertent answering of the neighbors' telephone when two or more systems are in the same vicinity, and the ability to eavesdrop on the neighbors' conversations. These latter problems are solved in the system of the present invention by digitizing and encoding the ring signals, the dialing pulses and the audio signals. This encoding is preferably in accordance with a pseudo random code to facilitate synchronization between the base station and the remote station.

BRIEF DESCRIPTION OF THE DRAWING

FIG. 2 is a block diagram of a base station constructed to operate in conjunction with the system of FIG. 1.

DETAILED DESCRIPTION OF THE ILLUSTRATED EMBODIMENT

Figure 1:
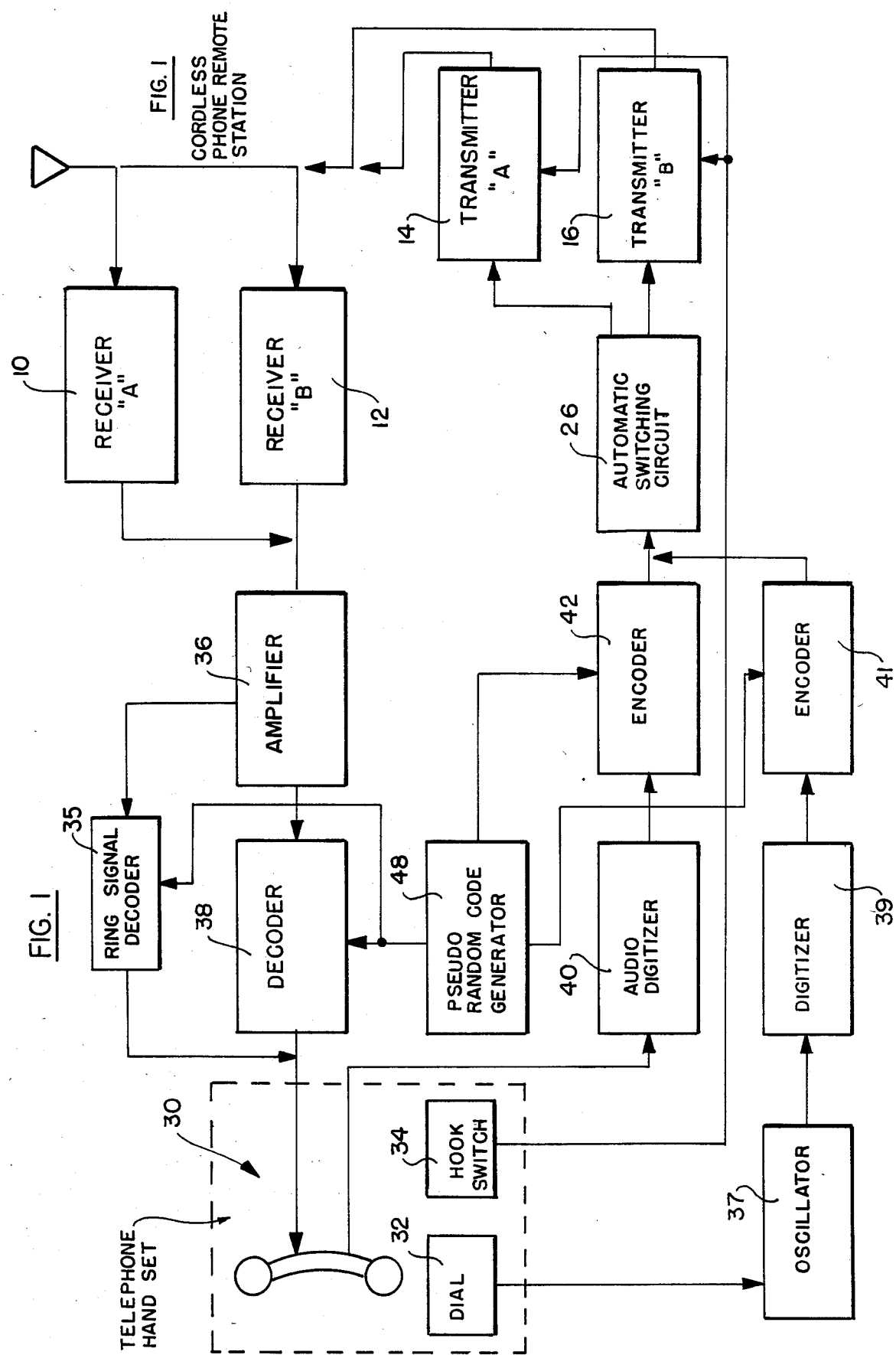
FIG. 1 is a block diagram of a remote station incorporating the concepts of the invention.

The systems shown in FIGS. 1 and 2 are generally similar to the cordless telephone system illustrated and described in U.S. Pat. No. 4,291,197.

The remote station of FIG. 1 includes two radio receivers 10 and 12 designated "A" and "B". The remote station also includes two transmitters 14 and 16, likewise designated "A" and "B".

The base station of FIG. 2, likewise contains two transmitters 18 and 20 designated "A" and "B", and it also contains two receivers 22 and 24, also designated "A" and "B". An automatic switching circuit 26 is included in the remote system of FIG. 1, and a similar automatic switching circuit 28 is included in the base system of FIG. 2.

Although two receivers and transmitters are shown in each instance, more may be incorporated into the system, if so desired. The purpose of the multiple transmitters and receivers is to maintain communication between the base station and the remote station, in the event of a null occurring for any channel. For example, if the transmitters and receivers of channel "A" are in use, and a null occurs, the automatic switching circuits 26 and 28 switch the system automatically to channel "B", so that communication may be maintained, even though the person at the remote station moves around from one position to another.

A usual telephone handset designated 30 is included in the remote station, the handset including the usual telephone instrument with a dial designated by block 32 and a hook switch designated by block 34.

The receivers 10 and 12 are connected to an amplifier 36, which is connected through a decoder 38 to the receiver of the handset. The microphone of the handset is connected to an audio digitizer 40, and the digitized audio signals from digitizer 40 are encoded in an encoder 42, and passed through the automatic switching circuit to transmitter 14 or transmitter 16.

The dial 32 of the handset is connected to an oscillator 37 so that the dialing pulses modulate the oscillator signal, and the resulting modulated signals are digitized in a digitizer 39 and encoded in an encoder 41. Encoder 41 is connected to the automatic switching circuit 26.

A pseudo random code generator 48 is included in the remote station, and it supplies a pseudo random code to the encoders 41 and 42, and to decoder 38. Amplifier 36 is also connected to a ring decoder 35 which, in turn, is connected to the receiver of hand set 30. The output of pseudo random generator 48 is applied to decoder 37 to decode the incoming ring signal.

The decoders 35 and 38, the encoders 41 and 42, the digitizers 39 and 40 and the pseudo random code generator 48, may be similar to equivalent units which are included in the system of U.S. Pat. No. 4,171,513 and, for that reason, there is no need to describe these units in circuit detail.

In the operation of the remote station of FIG. 1, encoded signals are received from the base station of FIG. 2 by receiver 10 or receiver 12. These encoded signals include ring signals and audio signals which are frequency modulated on a particular carrier, whose frequency is dependent upon the particular frequency to which receiver 10 or receiver 12 is tuned. The ring signals and audio signals are demodulated in the selected receiver, and are amplified by amplifier 36. The signals are decoded in decoders 35 and 38, and the ring decoded signals from decoder 35 are applied to the telephone handset to apprise the user that there is an incoming call. When the call is answered, the decoded audio signals from decoder 38 are introduced to the receiver portion of the handset.

As the user answers, the resulting audio signals are digitized in digitizer 40, encoded in encoder 42, and switched to either transmitter 14 or transmitter 16, depending upon the available channel.

On the other hand, if the user at the remote station wishes to initiate a call, he takes the instrument off the base to operate the hook switch 34 and activate transmitters 14 and 16. He then dials the desired number, and the dial pulses modulate oscillator 37. The modulations are then digitized in digitizer 39 and encoded in encoder 41, and are frequency modulated on the carrier in the selected transmitter for transmission to the base station. When the called party answers the telephone, the person at the remote station then speaks, and the resulting audio signals are digitized by digitizer 40, encoded by encoder 42, and frequency modulated on the carrier of the selected transmitter.

By the system described above, the incoming ring signals, being coded, have no tendency to activate adjacent systems. Also, when the user at the remote station of FIG. 1 dials a particular number, the resulting dial pulses are encoded, so there is no tendency for the user to dial through the adjacent system. Also, the incoming and outgoing audio is coded, so that privacy of communications is preserved.

For ease of synchronization, a long time-of-day pseudo random code is preferred to be generated by the random code generator 48, and an identical code can be generated at a predetermined start time by an identical pseudo random code generator 50 at the base station of FIG. 2. The various systems constructed in accordance with the invention may all have the same pseudo random code, but each may be started at a different time to preserve security.

The base station of FIG. 2 is connected to the telephone line through a usual hybrid circuit 54. Receivers 22 and 24, for example, are connected to an amplifier 56 which is connected to the hybrid circuit through a decoder 58. The amplifier 56 is also connected to a second decoder 60 which in turn is connected to a demodulator 62 for recovering the dial pulses. The dial pulses from demodulator 62 operate a dial pulse generator 64 which places the appropriate dial pulses on the telephone line through the hybrid circuit. When a called party has been contacted by the dialing pulses, the person at the remote station can then communicate with that person through receivers 22, 24; amplifier 56; decoder 58 and hybrid circuit 54.

Likewise, the incoming ring signals and audio signals from a calling party are digitized in respective digitizers 66 and 68, and are encoded in respective encoders 70 and 72. Encoders 70 and 72 are connected to the automatic switching circuit 28, so that the coded ring signals and audio signals may be transmitted by transmitter 18 or 20.

The encoders 70 and 72, and decoders 58 and 60, as well as the digitizers 66 and 68, may, likewise, be of the same type described in U.S. Pat. No. 4,171,513.

The invention provides, therefore, a cordless telephone system in which there is no tendency for the system to interfere with an adjacent system when a party is dialed, or when incoming ring signals are received from a calling party. Also, communication in the system is maintained private, by encoding the audio signals transmitted between the base station and the remote station.

A simplified form of pseudo random coding is preserved, of the type described in U.S. Pat. No. 4,171,513, and a time of day pseudo random code is preferably selected for ease of synchronizing, and also so that each system may have its own particular code, even though all are the same, but started at different times.

Also, nulls in communication are avoided by providing multiple channels between the remote station and the base station.

It will be appreciated that while a particular embodiment of the invention has been shown and described, modifications may be made. It is intended in the claims to cover all modifications which come within the true spirit and scope of the invention.

What is claimed is:

1. A cordless telephone system comprising a base station including base radio transmitter means and base radio receiver means, and a remote station including a telephone handset, remote radio receiver means, and remote radio transmitter means; said base station further including first circuit means connecting said base radio receiver means to a telephone line for applying to the telephone line audio signals received by said base radio receiver means from the remote transmitter, and second circuit means connecting the telephone line to the base radio transmitter means for applying audio signals received over the telephone line to the base radio transmitter means for transmission thereby to the remote receiver means; said remote station further including third circuit means connecting said remote receiver means to the handset for supplying audio signals received from the base transmitter means by said remote receiver means to the handset, and fourth circuit means connecting the handset to said remote transmitter means for applying audio signals received from the handset to said remote transmitter means for transmission thereby to the base receiver means; first and second encoder means respectively included in the second and fourth circuit means for encoding the audio signals transmitted between the remote station and the base station; first and second decoder means respectively included in the first and second circuit means for decoding the audio signals applied to the handset and to the telephone line; said base station including further circuit means connecting said telephone line to said base radio transmitter means for causing said base radio transmitter means to transmit ring signals received over the telephone line to the remote radio receiver means, and further encoder means included in said further circuit means for encoding the ring signals; said remote station including circuit means connecting said remote receiver means to the handset for supplying ring signals received from the base station to the handset, and further decoder means included in said last-named circuit means for decoding the ring signals; said remote station including encoder means connected to the handset for coding the dial pulses from the handset, and means connecting said last-named encoder means to said remote transmitter means for causing said remote transmitter means to transmit coded dial pulses to said base station, and said base station including a dial pulse decoder for decoding the coded dial pulses received from the remote station, and means connecting the dial pulse decoder to the telephone line.

2. The cordless telephone system defined in claim 1, and which includes a first pseudo random code generator included in the base station and connected to the first encoder means and to the first decoder means for supplying pseudo random encoding and decoding signals thereto, and a second pseudo random code generator included in the remote station and connected to the second encoder means and to the second decoder means for supplying pseudo random encoding and decoding signals thereto; a first digitizing circuit connected to the first encoder means for digitizing the audio signals supplied to the first encoder means, and a second digitizing circuit connected to the second encoder means for digitizing the audio signals introduced to the second encoder means.

3. The cordless telephone system defined in claim 2, in which the pseudo random code generator included in said base station is connected to said further encoder means for supplying pseudo random encoding signals to said further encoder means; and a digitizing circuit connected to said further encoder means for digitizing the ring signals supplied to said further encoder means.

4. The cordless telephone system defined in claim 2, in which the pseudo random code generator included in said remote station is connected to said further decoder means for supplying pseudo random decoding signals to said further decoder means.

5. The cordless telephone system defined in claim 1, in which said remote and base transmitter means each includes a plurality of transmitters transmitting information over different channels, and said remote and base receiver means each includes a plurality of receivers for receiving signals from the respective transmitters, and automatic switching means included in said base station and in said remote station for automatically selectively activating different transmitters of said base and remote transmitter means when the amplitude of signals transmitted between particular receivers of the receivers of the base and remote stations falls below a predetermined threshold.

* * * * *